United States Patent [19]

Papenfuhs et al.

[11] 4,294,749
[45] Oct. 13, 1981

[54] PROCESS FOR THE COLORATION OF THERMOPLASTIC POLYMERS AND POLYCONDENSATES IN THE MASS WITH WATER-INSOLUBLE DISAZO-METHINE COMPOUNDS

[75] Inventors: Theodor Papenfuhs, Frankfurt am Main; Wolfgang Teige, Kelkheim, both of Fed. Rep. of Germany

[73] Assignee: Hoechst Aktiengesellschaft, Fed. Rep. of Germany

[21] Appl. No.: 107,936

[22] Filed: Dec. 28, 1979

Related U.S. Application Data

[63] Continuation of Ser. No. 2,250, Jan. 10, 1979, abandoned.

[30] Foreign Application Priority Data

Jan. 13, 1978 [DE] Fed. Rep. of Germany ....... 2801288

[51] Int. Cl.³ .................... C08L 67/00; C09B 55/00
[52] U.S. Cl. .................... 260/40 P; 260/40 R; 260/429 C; 260/439 R
[58] Field of Search ............. 260/429 C, 439 R, 40 P, 260/40 R

[56] References Cited

U.S. PATENT DOCUMENTS

| | | | |
|---|---|---|---|
| 2,571,319 | 10/1951 | Waters et al. | 260/40 P |
| 3,489,713 | 1/1970 | Bowman et al. | 260/40 P |
| 4,038,241 | 7/1977 | Inman et al. | 260/42.21 |
| 4,042,611 | 8/1977 | Papenfuhs et al. | 260/429 C |
| 4,097,510 | 6/1978 | Papenfuhs et al. | 260/439 R |
| 4,113,759 | 9/1978 | Papenfuhs et al. | 260/439 R |

FOREIGN PATENT DOCUMENTS 847959 9/1960 United Kingdom .

*Primary Examiner*—Allan Lieberman
*Attorney, Agent, or Firm*—Connolly and Hutz

[57] ABSTRACT

For coloring in the mass and spin dyeing water-insoluble thermoplastic polymers and polycondensates, especially polyesters, nickel complex disazomethine compounds are used consisting of 2 molecules of 2-hydroxy-naphthaldehyde possibly substituted in 6-position by halogen, cyano, carboxy, a carboxylic acid alkyl ester or an optionally substituted carboxylic acid amide group, and 1 molecule of an o-phenylene diamine possibly substituted in 4 and 5-position by non-ionic substituents, the nickel atoms being bound in complex manner to the nitrogen atoms of the phenylene diamine and the oxyen atoms of the hydroxynaphthaldehyde. Disazomethine compounds in which the phenylene diamine radical is unsubstituted if the hydroxynaphthaldehyde radical is not substituted in 6-position are excluded. The coloring compounds can be added to the polymeric material without previous dispersion. They dissolved in said material in molecular disperse form so that generally brilliant and clear colorations are obtained. In spin dyeing the filaments substantially retain their high strength and drawing properties; abrasion and clogging of the nozzles or filters do not occur. The colorations are distinguished by a high color strength as well as by high fastnesses to light and to weather and by a good stability in thermofixation.

5 Claims, No Drawings

PROCESS FOR THE COLORATION OF THERMOPLASTIC POLYMERS AND POLYCONDENSATES IN THE MASS WITH WATER-INSOLUBLE DISAZO-METHINE COMPOUNDS

This application is a continuation of application Ser. No. 002,250 filed Jan 10, 1979 now abandoned.

This invention is related with the coloration in the mass by means of pigments.

Coloration in the mass with pigments is described, for example, in the Review of Progress in Coloration, Volume 5 (1974), pages 86 to 94. It is known from this publication that shaped structures, such as fibers of synthetic polymers, can be colored during synthesis by adding pigments in the form of appropriate preparations. Fibers and filaments of polyesters, for example, have been spun-dyed for years according to the so-called condensation process in which a pigment/ethylene glycol dispersion is added to the ester interchange mixture, prior to or after the ester inter hange of the starting material dimethyl terephthalate with ethylene glycol to obtain diglycol terephthalate while distilling off the methanol had been occured, or the dispersion is added to the reaction mixture prior to or during the polycondensation reaction of the starting components for the polyester material and the colored (pigmented) polymer is spun from the melt. This process is, however, disadvantageous in that the pigment used has to be dispersed in the form of sufficiently small particles about 2 μm in diameter and the condensation apparatus is soiled by the colored material, which necessitates a cleaning each time another pigment is to be used. Hence, this process is rather complicated and expensive. It is, therefore, used only for coloring the spinning mass with standard colors such as black, grey, navy blue and brown.

In practice, pigment concentrates (preparations) are also being used for spin dyeing synthetic polymers, such as polyesters and polyamides, which concentrates contain polyethylene waxes, polyesters and polyamides as carrier material.

The advantage of the latter process resides in the possibility rapidly to change the coloring component during the spinning of the polymer without an intermediate cleaning of the total apparatus being necessary, since it is only the spinning section of the apparatus that comes into contact with the pigment. The known processes of this type have, however, the disadvantage that in most cases the pigment distribution is insufficient in the preparations used, which are introduced into the polymer mass to be spun shortly before the spinning nozzle, so that the filters and spinning nozzles soon clog. Moreover, the addition of the preparation may reduce the strength of the colored polymer fibers. In order to avoid the difficulties resulting from pigment agglomerations in the spin dyeing of thermoplastic polymers, it is, therefore, necessary to use coloring components having a sufficient solubility in the molten and solidified polymer. Coloring components of this type are found, for example, in the series of vat dyestuffs and disperse dyestuffs, such as anthraquinone dyestuffs. Their suitability has to be found out by spinning experiments in which they are tested especially for a sufficient thermostability (for example in the case of polyester at 285° C. for 20 minutes), for their solubility in the polymer (above 2% by weight), for the tinctorial (coloristical) properties, and the spun-dyed materials themselves are tested as to their textile fastness properties (for example fastness to heat setting at 210° C. for 60 seconds).

It has now been found that compounds of the general formula (1)

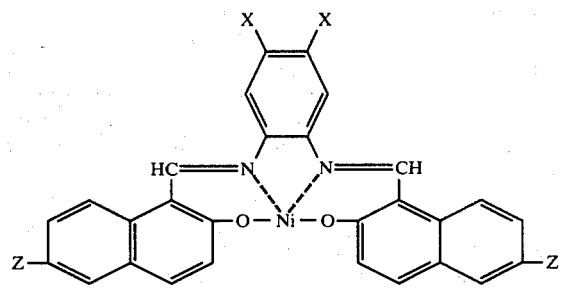

do not have the aforesaid disadvantages and are excellently suitable as coloring components, without previous dispersion, for coloring water-insoluble thermoplastic polymers and polycondensation products, preferably polyesters, in the mass.

In the above formula (1) the individual radicals have the following meaning:

X and Y each denote hydrogen, halogen, for example fluorine, chlorine, or bromine, alkyl having from 1 to 6 carbon atoms, preferably alkyl having from 1 to 4 carbon atoms, for example methyl or ethyl; alkoxy having from 1 to 6 carbon atoms, preferably alkoxy having from 1 to 4 carbon atoms, such as methoxy and ethoxy; an acylamino group of an alkane-carboxylic acid having from 2 to 6 carbon atoms, preferably 2 to 4 carbon atoms, such as acetylamino or propionylamino, or of a carbocyclic aromatic carboxylic acid, such as benzoylamino; cyano; carboxy; a carboxylic acid alkyl ester group having from 1 to 6 carbon atoms, preferably from 1 to 5 carbon atoms, in the alkyl moiety; the carboxylic acid amide group or a carboxylic acid amide group mono- or disubstituted at the nitrogen atom by alkyl having from 1 to 4 carbon atoms and/or phenyl optionally substituted once or twice by chlorine, methyl, ethyl, methoxy and ethoxy;

Z denotes hydrogen, halogen, for example fluorine, chlorine or bromine, cyano, carboxy, a carboxylic acid alkyl ester group having from 1 to 6 carbon atoms, preferably from 1 to 4 carbon atoms, in the alkyl moiety; the carboxylic acid amide group or a carboxylic acid amide group mono- or disubstituted at the nitrogen atom by alkyl groups having from 1 to 4 carbon atoms and/or phenyl radicals optionally being substituted once or twice by chlorine, methyl, ethyl, methoxy and ethoxy;

X, Y and Z being identical or different with the proviso that either X or Y or both are not hydrogen if Z is hydrogen, and the two radicals Z have the same meaning.

It is, therefore, the object of the present invention to use compounds of formula (1) as defined above for coloring in the mass water-insoluble thermoplastic polymers or polycondensates, preferably polyesters. It is another object of the invention to provide an improved process for coloring in the mass a water-insoluble thermoplastic polymer or polycondensate by methods such as generally used in practice with the inventive feature to use as a coloring material a compound of the above defined formula (1).

Thus, it is especially an object of the invention to provide a process for coloring a water-insoluble thermoplastic polymer or polycondensate by incorporating, at least partially incorporating, a coloring compound in the mass of said material or in the reaction mass for preparing said material, the improvement of which comprises incorporating as a coloring compound a compound of the formula (1) defined above. The step of incorporating the compound of formula (1) can be accomplished by various means, such as known in the art for other coloring compounds suitable for coloring water-insoluble thermoplastic polymers or polycondensates, for example especially by such means which are disclosed in the attached claims 2, 3, 4 and 5.

For example, the process of the invention can be carried out in that way that the compound of formula (1) is added to the polymer or polycondensate and dissoved therein by melting or is added before or during the polymerization or polycondensation reaction for the manufacture of the water-insoluble thermoplastic polymer or polycondensate to the reaction mass and dissolved therein, which comprises using as coloring component a compound of formula (1) as defined above and dissolving same in the polymer or polycondensate.

The term "coloring in the mass" in the sense of this invention also includes coloring of a mass for spin dyeing, respectively a process for spin dyeing wherein a compound of formula (1) is used as a coloring compound.

Preferably, the present invention relates to the use of the compounds of formula (1) for spin-dyeing, preferably of polyester fiber material, respectively, it relates preferably to a process for spin dyeing, preferably of polyester fiber material, wherein a compound of formula (1) is used as coloring component.

The present invention also provides water-insoluble thermoplastic polymers and polycondensates colored in the mass and containing, dissolved therein, a compound of formula (1) as coloring component.

According to the invention those compounds of forumla (1) are preferably used in which X and Y each denote alkyl having from 1 to 4 carbon atoms, alkoxy having from 1 to 4 carbon atoms, carboxy or a carboxylic acid alkyl ester group having from 1 to 4 carbon atoms in the alkyl moiety, and Z denotes hydrogen, carboxy or a carboxylic acid alkyl ester group having from 1 to 4 carbon atoms in the alkyl moiety, X, Y and Z being identical or different from one another. Especially good results are obtained with compounds of formula (1) in which X denotes methoxy, ethoxy, carboxy or a carboxylic acid alkyl ester group having from 1 to 4 carbon atoms in the alkyl moiety, and Y and Z each are hydrogen.

The compounds of formula (1) can be prepared by the processes described in German Offenlegungsschriften Nos. 2,460,490, 2,515,523 and 2,533,947.

Water-insoluble thermoplastic polymers or polycondensates that can be colored in accordance with the invention are, for example, polystyrene, polymethacylate, polyamide, polyvinyl chloride free from plasticizer, and especially linear polyesters. Such polymers and polycondensates are known in a great number from literature.

Polyesters that can be colored in the mass according to the invention are, for example, linear polymers from aromatic dicarboxylic acids, such as terephthalic acid, with aliphatic dihydroxy compounds, such as ethylene glycol, 1,4-dihydroxy-butane and 1,4-dimethylol cyclohexane. Polymers of this type are polybutylene terephthalate, poly-(1,4-dimethylol cyclohexane-terephthalate), preferably, however, polyethylene glycol terephthalate, as well as poly-$\epsilon$-caprolactone.

The coloration in the mass is carried out in known manner. To produce light shades the undyed polymer or polycondensate in the form of granules or chips can be first mixed with a compound of formula (1) (so-called coating process), whereupon the mixture obtained is heated and melted so that the compound of formula (1) dissolves in the polymer or polycondensate. This generally known coating process can only be used, as usual, for producing masses dyed light shades since the small surface area of the granules or chips used does not make it possible to use higher concentrations of coloring component, otherwise demixing would occur and the coated granules would dust. Colorations not only of light shade but also of very deep shade can be produced by adding the coloring component, i.e. the compound of formula (1) in the form of gritty particles or granules (preparation) to the polymer or polycondensate to be colored, for example in the form of granules or of a melt. Such preparations of coloring components, so-called master batches, consist of a compound of formula (1) and a suitable carrier material, the content of the compound of formula (1) possibly exceeding 50% by weight. Polymers suitable for coating or encapsulating the compound of formula (1) are the known thermoplastic carrier materials such a low molecular polyethylene, polypropylene, pulverulent polyamide or polyalkylene glycols, depending on the type of polymer or polycondensate to be colored. It is known, for example, that polyethylene and polyethylene waxes are little compatible only with polyesters and, hence, for coloring thermoplastic polyesters in the mass aliphatic polyesters having a melting point in the range of from about 60° to 120° C. are used as encapsulating polymer for the compound of formula (1). Polyesters of this type are, for example, poly-$\epsilon$-caprolactones having a molecular weight of from 1,000 to 50,000, linear aliphatic esters of linear aliphatic dicarboxylic acids having from 6 to 12 carbon atoms with an aliphatic and/or cycloaliphatic glycol having from 2 to 6 carbon atoms, such as poly-(ethylene glycol adipate) and poly-(ethylene glycol sebacate), poly-(ethylene glycol decane-dicarboxylate) and poly-(cyclohexanediol adipate) having a molecular weight in the range of from 2,000 to 15,000. Encapsulation polymers of this type and processes for their manufacture are described in literature. The manufacture of dyestuff concentrates from a carrier material (encapsulation polymer) and the compound of formula (1) is likewise known from literature and can be carried out, for example, in a kneader by which the compound of formula (1) is encapsulated in the carrier material at a temperature at which the molten carrier has a sufficiently high viscosity, or by which the compound of formula (1) is dissolved in the carrier material if it is used with a low concentration. The master batches obtained in this manner do not dust and can be readily used for coloring polymers or polycondensates, preferably polyester, in the desired shades.

It is also possible according to the invention to color thermoplastic polymers and polycondensates in the mass with a compound of formula (1) during their manufacture by polymerization or polycondensation. To this end, the compound of formula (1) is added per se or in the form of a master batch as described above to the polymerization or polycondensation mixture prior to or during polymerization or polycondensation, in the case of the manufacture of polyesters preferably in the form of a dispersion in the starting glycol, for example ethylene glycol. During polymerization or polycondensation the compound of formula (1) dissolves in the polymer or polycondensate formed. This process is carried out in a manner analogous to known polymerization and polycondensation processes in which a coloring substance is added to the reaction mixture.

The polymers and polycondensates colored in the mass by one of the above process variants can then be shaped and processed in usual manner for example by injection molding or spinning, or they can be used for the manufacture of sheets and films. It proved especially advantageous to use the compound of formula (1) in the form of a concentrate (master batch), which is added to the molten polymer or polycondensate to be colored either per se or in molten form. In this manner, the compound of formula (1) can be easily dosed and the desired color shade and intensity can be adjusted in simple and exact manner.

The polymers or polycondensates to be colored may contain matting agents, for example titanium dioxide, or substances of this type may be added.

The compounds of formula (1) are added to the polymers and polycondensates in an amount necessary for obtaining the desired intensity of shade. In general, the coloration in the mass according to the invention is carried out with 0.05 to 3% by weight of the compound of formula (1), relative to the weight of the colored thermoplastic material.

Owing to the fact that the compounds of formula (1) dissolve in molecular disperse form in the molten as well as in the solid state in the polymers and polycondensates and especially in polyesters and are thus contained in the colored mass not in the form of solid particles, filaments spun therefrom have a practically unaffected high strength and good drawing properties. In the spinning process itself the nozzles or filters cannot clog and no abrasion occurs in the spinning nozzles. It is, therefore, not necessary to disperse separately the compounds of formula (1) prior to their use, and processing difficulties are excluded.

According to a special embodiment of the present invention the compounds of formula (1) are used for spin dyeing, i.e. a special embodiment of the invention is a process for spin dyeing a polymer or polycondensate, preferably polyesters, wherein a compound of formula (1) is used as a coloring component. In analogy with known processes, for example when spinning on extrusion spinning machines, the compound of formula (1) is added in dosed quantities, preferably in the form of the aforesaid concentrate in the molten state, for example via a side screw, directly to the melt of the polymer or polycondensate to be spun, whereby a homogeneous mixing with dissolution of the compound of formula (1) is achieved. Alternatively, the mass can be spun on a grate spinning machine. It proved particularly advantageous to color the molten mass in spin dyeing by adding the aforesaid concentrate (master batch) of the compound of formula (1) in the molten state to the molten polymer or polycondensate directly before the spinning nozzle. It is thus especially advantageous to operate according to the injection process. In this manner soiling of the spinning equipment by the coloring substance can be avoided and the polymer or polycondensate to be spun can be dyed other or deeper shades either by changing the compound of formula (1) or the dose thereof.

The compounds of formula (1) yield intense, brilliant, yellowish red to brown colorations which possess very good fastnesses to light and to rubbing and an excellent stability (fastness) to thermofixation. Surprisingly, the compounds of formula (1) have a high solubility of up to 3% by weight and thereabove in the water-insoluble thermoplastic polymers and polycondensates; this solubility exceeds the maximum concentration limits desired in practice. It should be particularly stressed that the compounds of formula (1) dissolved in the molten mass surprisingly have an outstanding thermostability which make possible a processing of the colored mass even at temperatures of about 300° C. Hence, the compounds of formula (1) are excellently suitable for melt spinning. Moreover, they do not influence the viscosity of the spinning melt even in the case of intense coloration and do not impair the properties such as strength and elongation of the polymers or polycondensates or the shaped articles made therefrom, such as fibers and filaments. When using the compounds of formula (1) for the coloration in the mass, the colored material, especially in the form of thin structures such as fibers, filaments and films, meet the highest demands on color strength, fastness to light and to weather and even the otherwise critical stability to thermofixation. The high stability to thermofixation combined with the good polymer solubility of the compounds of formula (1) is especially surprising for the colored polymer and polycondensate masses.

The following examples illustrate the invention, the parts and percentages being by weight unless otherwise stated.

EXAMPLE 1

10 Parts of the compound of the formula

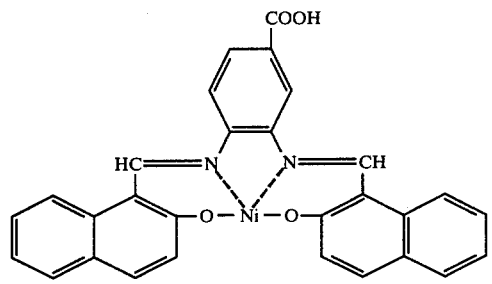

and 90 parts of ethylene glycol are made into a paste by stirring for 30 minutes with a rapid stirrer. 5 Parts of the paste obtained are blended with 95 parts of bis-($\beta$-hydroxyethyl)-terephthalate, and the blend is heated for 6 hours to 270° to 280° C., in a high vacuum, whereby condensation to the polyester takes place. The colored melt obtained in this manner is cooled and granulated in usual manner.

The colored polyester mass can be processed into shaped articles of different types by the usual processes, for example by injection molding or melt spinning. Brilliant, yellowish red colorations having a very good stability to thermofixation and fastness to light are obtained especially in the manufacture of filaments.

EXAMPLES 2 to 4

Instead of the disazomethine compound of Example 1 the following disazomethine compound corresponding to formula (1) are used,

| Ex. | X | Y | Z |
| --- | --- | --- | --- |
| 1 | —OCH₃ | —H | —H |
| 3 | —CH₃ | —CH₃ | —H |
| 4 | —Cl | —H | —H | the other conditions being the same. Brown, intense colorations having very good fastness properties are likewise obtained.

EXAMPLE 5

1 Part of a compound of formula (1) in which X, Y and Z each represent a carbomethoxy group, is blended with 99 parts of granular poly-1,4-dimethylol cyclohexane terephthalate, and the blend is melted at 270° to 280° C. whereby a homogeneous solution of the disazomethine compound in the melt is formed. From the colored melt polyester filaments having a brilliant yellowish red shade are spun by a conventional melt spinning process. The coloration is distinguished by a very good stability to thermofixation and fastness to light.

EXAMPLES 6 to 8

The process is carried out under the conditions specified in Example 5 with the exception that instead of the disazomethine compound used in that Example a disazomethine compound of formula (1) as indicated in the following table is used.

| Ex. | X | Y | Z |
| --- | --- | --- | --- |
| 6 | —OCH₃ | —Cl | —COOCH₃ |
| 7 | —OC₂H₅ | —H | —COOCH₃ |
| 8 | —CON(CH₃)₂ | —H | —COOCH₃ |

The filaments obtained have a vivid brown hue with very good utilitarian and fastness properties.

EXAMPLE 9

2.5 Parts of a preparation of 40 parts of a compound of formula (1) in which X and Z each denote hydrogen and Y stands for the carboethoxy group, and of 60 parts of an encapsulation polymer, for example a poly-ε-caprolactone, poly-(ethylene glycol adipate), poly-(ethylene glycol sebacate), poly-(ethylene glycol decane-dicarboxylate), poly-(cyclohexanediol adipate) or an isophthalic or a terephthalic acid copolyester with ethylene glycol and neopentyl glycol, are blended with 97.5 parts of poly-(ethylene glycol therephthalate), and filaments are spun from the melt by a process usual for polyester materials. The filaments obtained are distinguished by a brilliant, yellowish red shade having excellent fastness properties.

The preparation used can be made by mixing the coloring substance with the carrier material, melting the mixture, extruding it through a double screw extruder and granulating the extruded material.

EXAMPLES 10 to 37

The process is carried out as described in any one of Examples 1, 5 and 9, with the exception that instead of the disazomethine compounds used in these examples one of the following disazomethine compounds of formula (1) is used. A colored polymer mass or colored filaments are obtained having the shades as indicated in the table and characterized by good utilitarian properties and fastness properties.

| Ex. | Z | Y | X | shade |
| --- | --- | --- | --- | --- |
| 10 | —H | —H | —CN | yellowish red |
| 11 | —H | —H | —Br | brown |
| 12 | —H | —H | —CH₃ | yellowish red |
| 13 | —H | —H | —OC₂H₅ | bluish red |
| 14 | —H | —H | —NH—COCH₃ | red |
| 15 | —H | —H | —COOC₂H₅ | scarlet |
| 16 | —H | —H | —CONH—C₂H₄—OH | brown |
| 17 | —H | —H | —CONH— | brown |
| 18 | —H | —H | —CONH—C₄H₉(n) | scarlet |
| 19 | —H | —H | —CONH—CH₂—COOH | yellowish red |
| 20 | —H | —Cl | —COOH | red |
| 21 | —H | —Cl | —Cl | brown |
| 22 | —H | —CH₃ | —Br | brown |
| 23 | —H | —Cl | —COOCH₃ | reddish brown |
| 24 | —Br | —H | —H | yellowish red |
| 25 | —CN | —H | —H | red-orange |
| 26 | —COOH | —H | —H | orange |
| 27 | —COOC₂H₅ | —H | —COOH | scarlet |
| 28 | —CONH₂ | —CH₃ | —CH₃ | yellow brown |
| 29 | —CONH—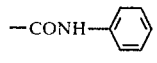 | —H | —H | brown |
| 30 | —CONH—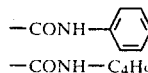—CH₃ | —H | —H | red brown |
| 31 | —CONH—C₄H₉(n) | —H | —OCH₃ | violet brown |
| 32 | —COOH | —H | —OCH₃ | red |
| 33 | —COOH | —OCH₃ | —OCH₃ | bluish red |
| 34 | —COOH | —H | —NHCOC₂H₅ | brown |
| 35 | —COOH | —H | —COOC₂H₅ | scarlet |

| Ex. | Z | Y | X | shade |
|---|---|---|---|---|
| 36 | —Br | —H | —COOH | yellowish red |
| 37 | —COOCH$_3$ | —H | —H | red orange |

What is claimed is:

1. In a process for spin-dyeing a water-insoluble thermoplastic polyester with a nickel-complex disazomethine coloring compound, the improvement consisting of spinning a melt of said polyester containing dissolved therein, as the coloring compound, a disazomethine compound of the formula (1)

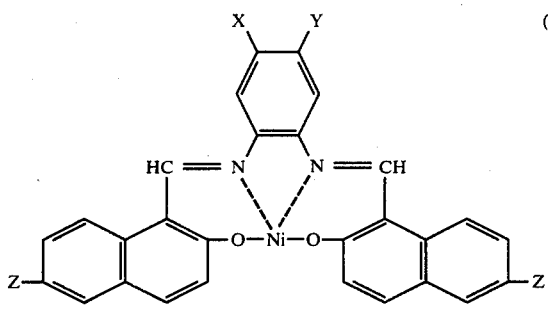

in which

X and Y each is hydrogen, alkyl of from 1 to 4 carbon atoms, alkoxy of from 1 to 4 carbon atoms, carboxy or carbalkoxy of from 1 to 4 carbon atoms in the alkyl moiety, and Z is hydrogen, carboxy or carbalkoxy of from 1 to 4 carbon atoms in the alkyl moiety, X, Y and Z being identical or different to each other, with the proviso that either X or Y or both are not hydrogen if Z is hydrogen.

2. A process according to claim 1, wherein the disazomethine compound is a compound of formula (1) in which X is hydrogen, Y is carboxy and Z is hydrogen, or X is hydrogen, Y is methoxy and Z is hydrogen, or X is hydrogen, Y is ethoxy and Z is hydrogen.

3. A process according to claim 1 with a coloring compound of formula (1) wherein X is methoxy, ethoxy, carboxy or carbalkoxy of from 1 to 4 carbon atoms in the alkyl moiety, and Y and Z each is hydrogen.

4. A process according to claim 1 or 3 wherein the compound of formula (1) is applied to the suface of the polyester and these components are melted together, or wherein the compound of formula (1) is added to a melt of the polyester, and dissolved therein.

5. A process according to claim 1 or 3 wherein the compound of formula (1) is added to a reaction mixture for the preparation of the polyester consisting essentially of an aromatic dicarboxylic acid and an aliphatic dihydroxy compound, or of ε-caprolactone.

* * * * *